United States Patent [19]

Mitchell, III et al.

[11] Patent Number: 4,542,121

[45] Date of Patent: * Sep. 17, 1985

[54] CATALYSTS FROM MOLYBDENUM POLYSULFIDE PRECURSORS, THEIR PREPARATION AND USE

[75] Inventors: Howard L. Mitchell, III, Metairie; Willard H. Sawyer, Baton Rouge, both of La.

[73] Assignee: Exxon Research and Engineering Co., Florham Park, N.J.

[*] Notice: The portion of the term of this patent subsequent to Feb. 7, 2001 has been disclaimed.

[21] Appl. No.: 570,364

[22] Filed: Jan. 13, 1984

Related U.S. Application Data

[63] Continuation-in-part of Ser. No. 399,947, Jul. 20, 1982, Pat. No. 4,430,442.

[51] Int. Cl.$^4$ .................. B01J 27/02; B01J 31/02; B01J 27/24; C01G 37/00
[52] U.S. Cl. .................. 502/220; 502/162; 502/164; 502/200; 502/222; 423/56
[58] Field of Search .............. 502/162, 164, 200, 220, 502/222; 423/56

[56] References Cited

U.S. PATENT DOCUMENTS

| | | | |
|---|---|---|---|
| 2,112,292 | 3/1938 | Jones | 423/53 X |
| 2,490,488 | 12/1949 | Stewart | 260/449.6 |
| 2,686,763 | 8/1954 | Johnson et al. | 252/439 X |
| 3,434,965 | 3/1969 | Joffe | 252/439 X |
| 3,876,755 | 4/1975 | Kurtak et al. | 423/56 |
| 3,997,473 | 12/1976 | Schmitt et al. | 252/439 |
| 4,066,530 | 1/1978 | Aldridge et al. | 208/112 |
| 4,098,839 | 7/1978 | Wilms et al. | 252/439 X |
| 4,111,796 | 9/1978 | Yanik et al. | 252/439 X |
| 4,134,825 | 1/1979 | Bearden et al. | 208/108 |
| 4,243,553 | 1/1981 | Naumann et al. | 252/439 |
| 4,243,554 | 1/1981 | Naumann et al. | 252/438 X |
| 4,303,634 | 12/1981 | Gatser | 252/439 X |
| 4,368,141 | 1/1983 | Kukes | 252/439 |
| 4,430,442 | 2/1984 | Sawyer et al. | 502/220 |

FOREIGN PATENT DOCUMENTS

| | | | |
|---|---|---|---|
| 1473900 | 3/1967 | France | 252/439 |
| 7510059 | 3/1976 | Netherlands | 252/439 |
| 7603197 | 9/1976 | Netherlands | 252/439 |

OTHER PUBLICATIONS

Thermal Decomposition of $(NH_4)_2MoO_2S_2$, T. P. Prasad et al, J. Eng. Chem., 1973, vol. 35, pp. 1845–1904.
Mills & Steffgen, Cat. Rev. 8, 159 (1973).
Noble Metals, Mo & W in Hydrocarbon Synthesis, J. F. Shultz et al., Report 6947, Jul. 1967.
Angrew, Chem. Int. Ed. Engl., 17, 279 (1978).

Primary Examiner—D. E. Gantz
Assistant Examiner—William G. Wright
Attorney, Agent, or Firm—Llewellyn A. Proctor

[57] ABSTRACT

A process for the preparation of novel highly active, highly selective hydrotreating catalysts. These catalysts are prepared, in bulk or in supported form, from a catalyst precursor characterized by the formula $B_x[Mo_3S_z]$ where B is an ammonium ion, polyammonium ion, tertiary or quaternary phosphonium ion, or a hydrocarbyl substituted ammonium ion, hydrocarbyl substituted polyammonium ion, or hydrocarbyl substituted tertiary or quaternary phosphonium ion, x is 1 where B is a divalent cationic moiety, or 2 where B is a monovalent cationic moiety, $[Mo_3S_z]$ is a divalent anionic moiety wherein z is an integer greater than 15. The catalyst precursor is dispersed in an ammonium sulfide or dilute ammonium polysulfide solution and heated to remove sulfur from said catalyst precursor to provide a z value of 15 or less. Carbon is also removed from the catalyst precursor and, where B of the $B_x[Mo_3S_z]$ catalyst precursor is a non-carbon containing moiety, the finished catalyst will contain an atomic ratio of C/Mo of less than about 0.05. Decomposition of the catalyst precursor in the presence of hydrogen, hydrocarbon and sulfur forms the highly active hydrotreating catalyst.

11 Claims, No Drawings

CATALYSTS FROM MOLYBDENUM POLYSULFIDE PRECURSORS, THEIR PREPARATION AND USE

RELATED APPLICATIONS

This is a continuation-in-part of application Ser. No. 399,947, filed July 20, 1982, by Willard H. Sawyer and Howard L. Mitchell, III, now U.S. Pat. No. 4,430,442. This application is herewith incorporated by reference.

BACKGROUND OF THE INVENTION

I. Field of the Invention

This invention relates to a process for the preparation of catalysts from molybdenum polysulfide precursors, and to the use of such catalysts in hydrotreating. In particular, it relates to a process for the preparation of species of highly active, highly selective, hydrotreating catalysts from molybdenum polysulfide catalyst precursors characterized as ammonium, or substituted ammonium trimolybdenum polysulfide trimers, and the use of such catalysts in hydrotreating processes.

II. Background and Prior Art

Hydrotreating processes are basic, and very well known to the petroleum refining industry. These processes require the treating with hydrogen of various hydrocarbon fractions, or whole heavy feeds, or feedstocks, in the presence of hydrogenation (hydrogen transfer) catalysts to effect conversion of at least a portion of the feeds, or feedstocks to lower molecular weight hydrocarbons, or to effect the removal of unwanted components, or compounds, or their conversion to innocuous or less undesirable compounds. Hydrotreating may be applied to a variety of feedstocks, e.g., solvents, light, middle, or heavy distillate feeds and residual feeds, or fuels. In hydrofining relatively light feeds, the feeds are treated with hydrogen, often to improve odor, color, stability, combustion characteristics, and the like. Unsaturated hydrocarbons are hydrogenated, and saturated. Sulfur and nitrogen are removed in such treatments. In the treatment of catalytic cracking feedstocks, the cracking quality of the feedstock is improved by the hydrogenation. Carbon yield is reduced, and gasoline yield is generally increased. In the hydrodesulfurization of heavier feedstocks, or residuas, the sulfur compounds are hydrogenated, and cracked. Carbon-sulfur bonds are broken, and the sulfur for the most part is converted to hydrogen sulfide which is removed as a gas from the process. Hydrodenitrogenation, to some degree also generally accompanies hydrodesulfurization reactions. In the hydrodenitrogenation of heavier feedstocks, or residuas, the nitrogen compounds are hydrogenated and cracked. Carbon-nitrogen bonds are broken, and the nitrogen is converted to ammonia and evolved from the process. Hydrodesulfurization, to some degree also generally accompanies hydrodenitrogenation reactions. In the hydrodesulfurization of relatively heavy feedstocks, emphasis is on the removal of sulfur from the feedstock which is usually converted to lower molecular weight, or lower boiling components. In the hydrodenitrogenation of relatively heavy feedstocks emphasis is on the removal of nitrogen from the feedstock, which also is converted to lower molecular weight, or lower boiling components. Albeit, hydrodesulfurization and hydrodenitrogenation reactions generally occur together, it is usually far more difficult to achieve effective hydrodenitrogenation of feedstocks than hydrodesulfurization of feedstocks.

The dwindling supplies of high grade petroleum feedstocks necessitates the increased production and processing of transportation fuels from lower grade, heavy petroleum feedstocks and synthetic liquid hydrocarbons derived from hydrocarbon-containing, or precursor hydrocarbon-containing, solids. The refiners feedstock sources as a result thereof continues to change, particularly as the worldwide supplies of petroleum diminish. The newer feedstocks often contain higher amounts of nitrogen, sulfur, and other materials. Nonetheless, whatever the difficulties, it remains a necessity to effectively hydrotreat the new feedstocks; often to a greater extent than previously was required. It has thus become necessary to process whole heavy petroleum crudes and residua from unconventional sources, as well as synthetic fuels (syncrudes; e.g., liquified coal, or coal from coal carbonization, oil from tar sands, shale oil and the like inclusive of residua or viscous syncrude fractions). All, particularly the later, are under active consideration as commercial feedstocks, or feedstock replacements for higher grade petroleum sources. Feedstocks derived from these sources are often of high olefinic content, contain more sulfur or nitrogen, or both, than feedstocks derived from more conventional crude oils.

Naphthas, notably those derived from syncrudes, viz., residua, shale oil, and coal, are highly unsaturated and contain considerably more sulfur, nitrogen, olefins, and condensed ring compounds than the more conventional naphthas. For example, nitrogen and sulfur are contained in cat naphtha in concentrations ranging upwardly from 50 ppm and 1000 ppm, respectively. In coal liquids nitrogen and sulfur are present in concentrations ranging upwardly from 1300 ppm and 5000 ppm, respectively; and oxygen is present in even higher concentrations. These compounds cause activity suppression and an all too rapid deactivation of the catalysts. Coke formation is increased, and there is more cracking with increased gas production. Albeit these compounds, except for condensed ring naphthenic compounds, can be removed by conventional hydrofining, this is a severe, if not an intolerable process burden due to the large hydrogen consumption; and hydrogen becomes more and more a very expensive commodity. Thus, generally considerably more upgrading is required to obtain usable products from these sources. Such upgrading generally necessitates hydrotreating the various hydrocarbon fractions, or whole crudes, and includes reactions such as hydrogenating to saturate olefins and aromatics, hydrodesulfurizing to remove sulfur compounds, hydrodenitrogenating to remove nitrogen, and conversion of high boiling compounds to lower boiling compounds.

Typical hydrotreating catalysts are exemplified by sulfided cobalt molybdate on alumina, nickel molybdate on alumina, cobalt molybdate promoted with nickel, and the like. Certain transition metal sulfides such as cobalt and molybdenum sulfides and mixtures thereof have also been employed in hydrofining processes for upgrading oils which contain sulfur and nitrogen compounds. For example, U.S. Pat. No. 2,914,462 discloses the use of molybdenum sulfide for hydrodesulfurizing gas oil and U.S. Pat. No. 3,148,135 discloses the use of molybdenum sulfide for hydrorefining sulfur and nitrogen-containing hydrocarbon oil. U.S. Pat. No. 2,715,603 discloses the use of molybdenum sulfide as a catalyst for the hydrogenation of heavy oils, while U.S. Pat. No.

3,704,783 discloses the use of molybdenum sulfides for producing sulfur-free hydrogen and carbon dioxide, wherein the molybdenum sulfide converts carbonyl sulfide to hydrogen sulfide. A serious disadvantage associated with the use of such catalysts is their relatively high cost, and the supply of catalytic metals is rather limited. Moreover, the reaction rates of such catalysts are relatively slow, particularly in the presence of nitrogen; and hydrogen consumption is quite high. These latter problems are particularly oppressive when it is realized that new generation feeds are unusually high in nitrogen, or sulfur, or both, and the cost of hydrogen is increasing at very high rates.

Molybdenum sulfide is also known to be useful for water gas shift and methanation reactions, as well as for catalyzed hydrotreating operations. Recently, e.g., it was disclosed in U.S. Pat. Nos. 4,243,553 and 4,243,554 that molybdenum disulfide catalysts of relatively high surface area can be obtained by thermally decomposing selected thiomolybdate salts at temperatures ranging from 300°–800° C. in the presence of essentially inert, oxygen-free atmospheres, e.g., atmospheres of reduced pressure, or atmospheres consisting of argon, nitrogen, and hydrogen, or mixtures thereof. In accordance with the former, a substituted ammonium thiomolybdate salt is thermally decomposed at a very slow heating rate of from about, 0.5° to 2° C./min and in accordance with the latter an ammonium thiomolybdate salt is decomposed at a rate in excess of 15° C. per minute to form the high surface area molybdenum disulfide.

III. Our application Ser. No. 399,947

In our application Ser. No. 399,947, filed July 20, 1982, supra, there is disclosed a process for the preparation of hydrotreating catalysts formed from a catalyst precursor comprising an ammonium, or substituted ammonium tri-molybdenum polysulfide complex salt, or molybdenum trimer, which is contacted with a hydrocarbon feedstock, or hydrocarbons, and decomposed, in the presence of hydrogen, and sulfur, or sulfur-bearing compound. The catalyst precursor, when decomposed in the presence of hydrogen, and hydrocarbon and sulfur, forms a reaction product which is a highly active, selective and stable hydrotreating catalyst.

The catalyst precursor, i.e., the ammonium, or substituted ammonium tri-molybdenum polysulfide complex salt, or molybdenum trimer, as disclosed in said application, is characterized by the formula $B_x[Mo_3S_z]$ where B is an ammonium ion, polyammonium ion, or tertiary or quaternary phosphonium ion, or an organo or hydrocarbyl substituted ammonium ion (e.g., a primary, secondary, tertiary or quaternary substituted ammonium ion), organo or hydrocarbyl substituted polyammonium ion, or an organo or hydrocarbyl substituted tertiary or quaternary phosphonium ion, x is 1 where B is a divalent cationic moiety, or 2 where B is a monovalent cationic moiety, and [Mo$_3$S$_z$] is a divalent anionic moiety wherein z is an integer ranging from about 10 to about 46, preferably from about 12 to about 20.

These precursor catalyst species can be unsupported, or supported as where distended or dispersed upon a porous, refractory inorganic oxide carrier. In forming a supported precursor catalyst species, the trimer is formed in situ upon the support, or the trimer, after its formation, is dispersed or dissolved in a solvent and incorporated with a preselected quantity of said porous, refractory inorganic oxide support, preferably a particulate mass of said support, and the trimer-containing support then preferably dried without decomposition of said trimer, to remove all or a portion of the solvent from the support. Generally, sufficient trimer is incorporated on the support to provide from about 3 percent to about 20 percent, preferably from about 6 percent to about 17 percent of molybdenum as trimer, expressed as weight percent Mo on an ignition loss free basis. In completing formation of a catalyst the dried particulate mass containing the precursor catalyst species is contacted and decomposed in the presence of hydrogen with a hydrocarbon, and sulfur or a sulfur-bearing compound; or contacted and decomposed in the presence of hydrogen with a compound which supplies both the hydrocarbon and sulfur species, i.e., a sulfur-containing hydrocarbon compound, e.g., a heterocyclic sulfur containing compound, or compounds. In conducting a hydrotreating reaction, a hydrocarbon feedstock and hydrogen are contacted with the catalyst at hydrotreating conditions.

In the application it was disclosed that highly active catalysts could be formed from the catalyst precursor when the amount of sulfur associated with the molybdenum of the [Mo$_3$S$_z$] moiety appeared less than was required to satisfy the valence of the molybdenum, or greater than that which was required to satisfy the valence of the molybdenum. The preferred values of "z" in the formula B$_x$[Mo$_3$S$_z$], supra, ranged from about 12 to 20, though values ranging from about 10 to 46 were suggested as acceptable. In the preparation of the B$_x$[Mo$_3$S$_z$] catalytic precursors, however, the consistency, and reproducability of the data has been less than desirable. Thus, though it had been recognized that the more active catalysts were formed from the B$_x$[Mo$_3$S$_z$] catalytic precursors wherein z ranged from about 12 to 20, it proved rather difficult to consistently, and reproducibly prepare these preferred species of catalyst precursor. Oddly enough also, even when catalysts were prepared from the B$_x$[Mo$_3$S$_z$] catalyst precursors where the z value ranged from about 12 to 20, sometimes even these catalysts were not as active as would otherwise have been expected. It was also found that the activity of the catalyst prepared from a B$_x$[Mo$_3$S$_z$] catalyst precursor was affected by the amount of carbon formed in the catalyst produced from a catalyst precursor. The presence of high carbon levels in the finished catalyst has been found to adversely affect catalyst aromatics hydrogenation and hydrodenitrogenation activity, and catalysts which have an atomic ratio of C/Mo above about 0.05 have been found to be less active than desired.

IV. Objects

It is, accordingly, the primary object of the present invention to obviate these and other disadvantages.

A particular object of this invention is to provide a novel process for the preparation of B$_x$[Mo$_3$S$_z$] catalyst precursors from which highly active catalysts can be consistently and reproducibly prepared.

A further, and more specific object is to provide a novel process for the more consistent and reproducible preparation of a preferred class of B$_x$[Mo$_3$S$_z$] catalyst precursors; from which more highly active catalysts can be consistently and reproducibly prepared.

It is also an object to provide more highly acitive hydrogenation catalysts, as well as a novel process for this preparation, and use.

THE INVENTION

These objects and others are achieved by the process of this invention, embodying the preparation and use as a starting material of a catalyst precursor $B_x[Mo_3S_z]$ as described in parent application Ser. No. 399,947, supra, wherein the value of z is greater than 15, and its treatment by dispersing and heating within an ammonium sulfide or dilute ammonium polysulfide solution to reduce the sulfur level of the catalyst precursor and provide $B_x[Mo_3S_z]$ catalyst precursors wherein the value of z after such treatment consistently ranges between about 10 and about 15, or as is most preferable between about 10 and about 13. Preferably also, the $B_x$ moiety or the $B_x[Mo_3S_z]$ is an ammonium ion, polyammonium ion, or tertiary or quaternary phosphonium ion, and the catalyst precursor after such treatment contains an atomic ratio of C/Mo less than about 0.05, and more preferably less than 0.02.

During its preparation waters of hydration become associated with the $B_x[Mo_3S_z]$ catalyst precursor. During the washing steps, which includes washing with ethanol, these waters of hydration are replaced by the ethanol moiety, at least to some degree. Thus, the trimers have high water of hydration levels, and after the washing steps will also contain high levels of ethanol. It has been found with trimer materials wherein B of the formula $B_x[Mo_3S_z]$ is an ammonium ion that the very highest levels of catalytic activity are attained when the atomic ratio of C/Mo is below 0.05, preferably 0.02. These C/Mo levels are indicative of low levels of water of hydration that have been replaced by ethanol moieties in the washing steps. Thus, the secondary treatment step used to reduce the sulfur content to $z=10-15$, and preferably to $z=10-13$, also reduces the waters of hydration levels of the catalyst precursor as evidenced by the low C/Mo ratios of less than 0.05, and preferably 0.02.

The starting material for the practice of this invention is thus the catalyst precursor, i.e., the ammonium, or substituted ammonium tri-molybdenum polysulfide complex salt, or molybdenum trimer, characterized by the formula

$$B_x[Mo_3S_z]$$

where B is an ammonium ion, polyammonium ion, or tertiary or quaternary phosphonium ion, or an organo or hydrocarbyl substituted ammonium ion (e.g., a primary, secondary, tertiary or quaternary substituted ammonium ion), organo or hydrocarbyl substituted polyammonium ion, or an organo or hydrocarbyl substituted tertiary or quaternary phosphonium ion, x is 1 where B is a divalent cationic moiety, or 2 where B is a monovalent cationic moiety, and $[Mo_3S_z]$ is a divalent anionic moiety wherein z is an integer ranging greater than 15, generally from greater than 15 to as much as 120, and higher. Preferably B in the starting material is an ammonium ion, polyammonium ion, or tertiary or quaternary phosphonium ion; or, in other words, non-carbon containing moiety.

High sulfur-containing catalyst precursors of this character, after formation and separation from its mother liquor, can be dispersed, triterated, and heated in an ammonium sulfide or dilute ammonium polysulfide solution such that sulfur will be displaced from the high-sulfur containing $B_x[Mo_3S_z]$ catalyst precursor, and evolved from the solution, to form a $B_x[Mo_3S_z]$ catalyst precursor having a value for z ranging from about 10 to about 15, preferably from about 10 to about 13. Moreover, treatment with the ammonium sulfide or dilute ammonium polysulfide solution will reduce the carbon levels of the high-sulfur-containing $B_x[Mo_3S_z]$. The C/Mo atomic ratio of the $B_x[Mo_3S_z]$ catalyst precursor, where B is a non-carbon containing moiety, will, subsequent to such treatment, consistently fall below about 0.05, most often below about 0.02.

The catalyst precursor $B_x[Mo_3S_z]$, exists as a complex salt between one, two or more of the $B_x$ cationic moieties and the $[Mo_3S_z]$ anionic moiety, as required to satisfy the negative charge of the $[Mo_3S_z]$ anionic moiety. For example, when the anionic moiety has a minus two $(2-)$ charge, $B_x$ can be a pair of ammonium ions, a pair of quaternary phosphonium ions, or a pair of organo or hydrocarbyl substituted monovalent ammonium ions, or a pair of organo or hydrocarbyl substituted tertiary or quaternary phosphonium ions, or $B_x$ can be a doubly charged diammonium ion, or an organo or hydrocarbyl substituted polyammonium ion. The doubly charged $[Mo_3S_z]$ anionic moiety, on the other hand, contains three atoms of molybdenum, the molybdenum atoms being bonded together to form a metallic cluster wherein the molybdenum atoms are associated with sulfur. In the molybdenum trimer, it is believed that the $[Mo_3S_z]$ anion exists ideally as $Mo_3(S_2)_6S$, or $Mo_3S_{13}$. The molybdenum trimer, in other words, ideally appears to contain 13 sulfur atoms. It also contains three types of sulfur as determined by the nature of the sulfur bonds.

The $B_x[Mo_3S_z]$ catalyst precursor, where $z=13$, might thus be written in terms of the formula: $B_x[Mo_3(S_6)_b(S_6)_t(S)_c]$, where subscript b identifies the six sulfur atoms, each of which are bonded between two atoms of Mo, i.e., bridging sulfur; subscript t identifies the three sets of two sulfur atoms, each pair of sulfur atoms constituting a set of sulfur atoms which are bonded to a Mo atom and to each other, these three pairs of sulfur atoms forming a terminal ring of sulfur attached to each of the Mo atoms, i.e., terminal sulfur; and subscript c identifies a single sulfur atom bonded between all three Mo atoms, i.e., capping sulfur. Apparently, additional sulfur atoms are readily added to a single $B_x[Mo_3S_z]$ catalyst precursor molecule by insertion within any one of all of the three terminal sulfur rings, $(S_6)_t$, this permitting the total number of sulfur atoms in a molecule to far exceed 13. Sulfur atoms can also be removed from the molecule such that a molecule of the $B_x[Mo_3S_z]$ catalyst precursor can be less than 13.

In the formation of the B moiety, or moieties, the substitutent members of the substituted ammonium ion, polyammonium ion, tertiary or quaternary phosphonium ion, can be an organo, a hydrocarbyl or a hydrocarbon group, or groups, and the substitutent organo, hydrocarbyl or hydrocarbon group, or groups, can be inertly substituted. Exemplary of an organo, a hydrocarbyl radical or hydrocarbon substituent radical is one selected from the group consisting of alkyl, aralkyl, cycloalkyl, aryl, alkaryl, alkenyl, and alkynyl including such radicals when inertly substituted. Such radical can thus be exemplified by hydrocarbon groups which contain from one to about 30 carbon atoms, preferably from one to about 20 carbon atoms. When the hydrocarbyl, or hydrocarbon radical is alkyl, it can typically be methyl, ethyl, n-propyl, iso-propyl, n-butyl, i-butyl, sec-butyl, amyl, octyl, decyl, octadecyl, and the like. When it is aralkyl it can typically be benzyl, beta-phenylethyl, and the like. When it is cycloalkyl, it can typically be cyclopentyl, cyclohexyl, cycloheptyl, cyclooctyl, 2-methylcycloheptyl, 3-butylcyclohexyl, 3-methylcyclohexyl, and the like. When it is aryl, it can typically be phenyl, ethylphenyl, and the like. When alkaryl, it can typically be tolyl, xylyl, and the like. When alkenyl, it can typically be vinyl, allyl, 1-butenyl, and the like. When it is alkynyl, it can typically be ethynyl, propynyl, butynyl, and the like. The hydrocarbyl, or hydrocarbon radical can be inertly substituted, i.e., it may bear a non-reactive substitutent such as alkyl, aryl, cycloalkyl, ether, halogen, nitro, hydroxy, and the like. Typically inertly substituted groups may include 3-chloropropyl, 2-ethoxyethyl, carboethoxymethnyl, 4-methylcyclohexyl, p-chlorophenyl, p-chlorobenzyl, 3-chloro-5-methylphenyl, methoxyethyl, methoxyethoxyethyl, hydroxyethyl, etc. Substituted ammonium ions of such types are thus those containing one organo or hydrocarbyl group, e.g., n-$C_4H_9NH_3^+$, $C_6H_5NH_3^+$, and the like, those containing two organo or hydrocarbyl groups, e.g., $(C_2H_5)_2HN_2^+$, $(C_2H_5)_2NH_2^+$, and the like, those containing three organo or hydrocarbyl groups, e.g., (n-$C_6H_{13})_3NH^+$, $(C_6H_5)_3NH^+$, (n-$C_4H_9)_3PH^+$, and the like; those containing four organo or hydrocarbyl groups, e.g., $(C_6H_{13})_4N^+$, $(C_6H_5)_3P^+(CH_2C_6H_5)$, $(C_6H_5CH_2)_3^+NCH_3$, $(C_6H_5)_4P^+$ and the like; and those containing greater than four organo or hydrocarbyl groups as when the moiety is a substituted diammonium ion, e.g., $[(CH_3)_3N^+CH_2CH_2CH_2]_2$, $[(CH_3)_2N^+HCH_2CH_2]_2$, and the like.

The $B_x[Mo_3S_z]$ catalyst precursor can be conveniently prepared by synthesis from an ammonium, or organo or hydrocarbyl substituted ammonium polysulfide, or hydropolysulfide, and an ammonium, or organo or hydrocarbyl substituted ammonium, or alkali metal, oxo, thio, or oxothio molybdenum salt. The ammonium, or organo or hydrocarbyl substituted ammonium polysulfide, or hydropolysulfide, is made by reaction between an ammonium, or organo or hydrocarbyl substituted ammonium polysulfide, or hydropolysulfide, and hydrogen sulfide, in solution, e.g., as represented by the equation $$NH_4OH + H_2S \rightleftharpoons (NH_4)SH + (NH_4)_2S$$

to which sulfur is added, as represented by the equations, e.g.,

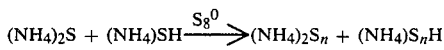

$$(NH_4)_2S + (NH_4)SH \xrightarrow{S_8^0} (NH_4)_2S_n + (NH_4)S_nH$$

where n ranges from about 1.05 to about 5.5, preferably from about 1.1 to about 3.1. Exemplary of oxo ammonium molybdate salts are $(NH_4)_6Mo_7O_{24}$, $(NH_4)_2MoO_4$ and $(NH_4)_2Mo_2O_7$ which are prepared by reaction between ammonium hydroxide and molybdic acid or molybdenum trioxide, the species actually formed in such reaction being directly related to the pH of the solution. Similar alkali metal salts, e.g., sodium salts, can also be utilized. Exemplary of thio ammonium salts is $(NH_4)_2MoS_4$, and exemplary of oxothio ammonium salts is $(NH_4)_2MoO_2S_2$. The ammonium, or organo or hydrocarbyl substituted ammonium polysulfide, or hydropolysulfide and the ammonium, or organo or hydrocarbyl substituted ammonium, oxo, thio, or oxothio molybdenum salt are contacted or brought together to form the synthesis mixture.

An admixture of ammonium heptamolybdate, $(NH_4)_6Mo_7O_{24}$, and ammonium polysulfide, or ammonium hydropolysulfide, $NH_4S_xH$, can, e.g., be reacted to produce the trinuclear cluster, or trimer, characterized as $(NH_4)_2[Mo_3(S_2)_6S]$ as well as non-stoichiometric forms thereof of variable sulfur contents. In general, e.g., the reaction between ammonium heptamolybdate, ammonium dimolybdate, or ammonium molybdate and concentrated aqueous ammonium polysulfide, or ammonium hydropolysulfide, at about ambient temperature, e.g., 25° C., over a period of about 18 hours at pH ranging from about 8 to about 14, will produce an essentially brown in color amorphous structure, essentially an $Mo_3$ structure of variable ammonium ion and sulfur contents; but which nonetheless has catalytic activity. Reaction at higher temperature, e.g., about 60°–70° C., over a period of about 5 hours produces the trinuclear cluster, or trimer, characterized as $(NH_4)_2[Mo_3(S_2)_6S]$, a crystalline material maroon in color, inclusive particularly of non-stoichiometric forms thereof of variable sulfur content. A related higher sulfur compound also occurs in which some of the $S_2$ moieties characterized as ring sulfur appear to be $S_x$, where x is a number ranging from about 2 to about 5. A red crystalline material, $(NH_4)_2[Mo_3(S_2)_6S]$ can in turn be synthesized directly by the reaction of ammonium heptamolybdate, ammonium dimolybdate, or ammonium molybdate and ammonium polysulfide, or ammonium hydropolysulfide, at more elevated temperatures, e.g., 85°–90° C., at pH ranging from about 8 to about 14 over a period of about 18 hours to about 75 hours with concurrent escape of $NH_3$ and $H_2S$ by allowing the solution to boil vigorously. The reaction procedure evidently forces the transfer of sulfur from ammonium polysulfide species to the apparently previously formed maroon, or dark red $(NH_4)_2[Mo_3(S_2)_6S]$ compound.

The trinuclear cluster, or trimer, is thus generally produced as a non-stoichiometric admixture which usually contains excessive sulfur, z of the formula $B_x[Mo_3S_z]$ ranging above 15, generally from above 15 to about 120, and greater. The non-stoichiometric admixture is separated from its mother liquor and then may be washed to remove as much of the impurities therefrom as possible. In a typical preparation, the trimer is filtered and separated from its mother liquor. The filtered trimer may be successively washed with portions of ammonium sulfide or ammonium polysulfide, water, ethanol, $CS_2$ and ether. The washed or unwashed cluster is then treated with ammonium sulfide or dilute ammonium polysulfide solutions at an elevated temperature sufficient to boil, or drive off the excess sulfur from the trimer, the sulfur being evolved from the solution as hydrogen sulfide. Generally, during the treatment, the ammonium sulfide, or dilute ammonium polysulfide solution is heated to a temperature ranging from about 50° C. up to the boiling point of the solution, preferably from about 60° C. to about 70° C. The vessel containing the ammonium sulfide or ammonium polysulfide solution is maintained at ambient, or lower pressure to aid in the release of sulfur from the $B_x[Mo_3S_z]$ catalyst precursor, as it is being driven off as hydrogen sulfide. The excess sulfur is generally removed from the trimer to produce a $B_x[Mo_3S_z]$ catalyst precursor, where z is 15 or less, over a period ranging from about 0.5 hour to about 24 hours, preferably and more generally from about 4 hours to about 16 hours. Water is removed from the trimer by washing with an organic solvent capable of removing the water as described above, but incapable of dissolving any significant portion of the molybdenum trimer. Suitably, the water is removed with an alcohol, e.g., ethyl alcohol. The trimer is further washed with carbon disulfide, then with ether, e.g., ethyl ether, to remove the alcohol, and the trimer then dessicated.

The presence of carbon in the finished catalyst precursor, as suggested, adversely affects the aromatics hydrogenation and hydrodenitrogenation activity of the finished catalysts. The secondary treatment, or trituration of the trimer with the ammonium sulfide, or dilute ammonium polysulfide, not only removes excess sulfur from the trimer but, where B of the $B_x[Mo_3S_z]$ catalyst precursor is a non-carbon containing moiety, it also produces a finished, low-sulfur catalyst precursor which contains an atomic ratio of C/Mo of less than about 0.05, and generally less than 0.02. It is believed that the carbon impurity which formerly appeared in the finished catalyst was introduced during the wash steps with the organic solvents, i.e., with the alcohol or ether, or both, supra. Whatever its source however, significant carbon no longer appears in the finished catalyst when the catalyst precursor, where B of the $B_x[Mo_3S_z]$ catalyst precursor is a non-carbon containing moiety, is treated in accordance with the procedure described.

The molybdenum polysulfide catalyst can be employed in bulk, or unsupported form, or composited or otherwise intimately associated with a porous, inorganic oxide support by various techniques known to the art, such as coprecipitation, impregnation or the like. The dispersion of the catalyst on a support has been found to considerably increase its activity. The composite may be formed from a solution of the desired precursor catalyst species by impregnation of the support, typically via an "incipient wetness" technique which requires a minimum of solution for uptake of the total solution within which the preselected desired amount of the catalyst precursor is adsorbed, initially or after some evaporation. Virtually, any solvent can be employed which is capable of dissolving the precursor catalyst species without adversely reacting therewith. Albeit, an aqueous solvent can be employed, non-aqueous solvents are preferred because few of the catalyst precursor species are adequately soluble in water. Suitable solvents for dissolving these precursor catalyst species are dimethyformamide, dimethylacetamide, dimethylsulfoxide (DMSO), acetonitrile and the like. Typically, a particulate porous refractory inorganic oxide, notably alumina, in the form of beads, pills, pellets, sieved particles, extrudates, or the like in dry or solvated state is contacted with a solution of the precursor catalyst species, or admixture of the precursor catalyst species, with the result that the salt solution is adsorbed into the particulate material in the desired amount. Typically, because of the low solubility of the precursor catalyst species, multiple impregnations are required. A support is impregnated with the solution, the support dried, and such steps repeated. The catalyst precursor-containing particulate material is always heated and dried at low temperature, with or without vacuum assistance, e.g., at temperatures ranging at or below the boiling temperature of the solvent, excessive temperature being avoided until such time that the catalyst precursor is decomposed in the presence of hydrogen, hydrocarbon, and sulfur to produce the active catalyst species.

The preferred support is alumina, and the composite support can contain for example, one or more of alumina, bentonite, clay, diatomaceous earth, zeolite, silica, activated carbon, magnesia, zirconia, thoria, titania and the like, these latter with alumina, usually in a range of about 1 to 20 percent, based on the weight of the support. A preferred support for the practice of the present invention is one having a surface area of more than 50 $m^2/g$, preferably from about 100 to about 300 $m^2/g$, a bulk density of about 0.3 to 1.0 g/ml, preferably about 0.4 to 0.8 g/ml, an average pore volume of about 0.2 to 1.1 ml/g, preferably about 0.3 to 0.8 ml/g, and an average pore diameter of about 30 to 300 U.

The precursor catalyst species impregnated support is preferably dried to remove all or a portion of the solvent, preferably at a temperature below about 100° C., more preferably between about 50° C. and 80° C., in the presence of nitrogen or oxygen, or both, at static or dynamic conditions, in air or inert gas, or under reduced pressure. The impregnated support, or composite formed via other methods, on a dry basis, contains from about 3 percent to about 20 percent, preferably from about 6 percent to about 17 percent of molybdenum as the undecomposed precursor catalyst species, expressed as weight percent Mo on an ignition loss free basis.

The catalyst precursor, whether supported or unsupported, is heated to the decomposition temperature, and decomposed in the presence of hydrogen, and a hydrocarbon and sulfur, or sulfur-bearing compound, e.g., at "on-oil" conditions, to form the active catalyst species of this invention. The nature of the hydrocarbon is not critical, and can generally include any hydrocarbon compound, acyclic or cyclic, saturated or unsaturated, unsubstituted or inertly substituted. The preferred hydrocarbons are those which are liquid at ordinary temperatures, exemplary of which are such straight chain saturated acyclic hydrocarbons as octane, tridecane, eicosane, nonacosane, or the like; straight chain unsaturated acyclic hydrocarbons as 2-hexene, 1,4-hexadiene, and the like; branched chain saturated acyclic hydrocarbons as 3-methylpentane, neopentane, isohexane, 2,7,8-triethyldecane, and the like; branched chain unsaturated acyclic hydrocarbons such as 3,4-dipropyl-1,3-hexadiene-5-yne, 5,5-dimethyl-1-hexene, and the like; cyclic hydrocarbons, saturated or unsaturated, such as cyclohexane, 1,3-cyclohexadiene, and the like; and including such aromatics as cumene, mesitylene, styrene, toluene, o-xylene, or the like. The more preferred hydrocarbons are those derived from petroleum, including especially admixtures of petroleum hydrocarbons characterized as virgin naphthas, cracked naphthas, Fischer-Tropsch naphtha, light cat cycle oil, heavy cat cycle oil, and the like, typically those containing from about 5 to about 30 carbon atoms, preferably from about 5 to about 20 carbon atoms and boiling within a range of from about 30° C. to about 450° C., preferably from about 150° C. to about 300° C.

The sulfur, or sulfur-bearing compound, is characterized as an organo-sulfur, or hydrocarbyl-sulfur compound which contains one or more carbon-sulfur bonds within the total molecule, and generally includes acyclic or cyclic, saturated or unsaturated, substituted or inertly substituted compounds. Exemplary of acyclic compounds of this character are ethyl sulfide, n-butyl sulfide, n-hexylthiol, diethylsulfone, allyl isothiocyanate, dimethyl disulfide, ethylmethylsulfone, ethylmethylsulfoxide, and the like; cyclic compounds of such character are methylthiophenol, dimethylthiophene, 4-mercaptobenzoic acid, benzenesulfonic acid, 5-formamido-benzothiazole, 1-napthalenesulfonic acid, dibenzylthiophene, and the like. The sulfur must be present in at least an amount sufficient to provide the desired stoichiometry required for the catalyst, and preferably is employed in excess of this amount. Suitably, both the hydrocarbon and sulfur for the reaction can be supplied by the use of a sulfur-containing hydrocarbon compound, e.g., a heterocyclic sulfur compound, or compounds. Exemplary of heterocyclic sulfur compounds suitable for such purpose are thiophene, dibenzothiophene, tetraphenylthiophene, tetramethyldibenzothiophene, tetrahydrodibenzothiophene, thianthrene, tetramethylthianthrene, and the like. The hydrogen required for forming the catalysts of this invention may be pure hydrogen, an admixture of gases rich in hydrogen or a compound which will generate in situ hydrogen, e.g., a hydrogen-generating gas such as carbon monoxide mixtures with water, or a hydrogen donor solvent.

In decomposing the catalyst precursor, a bed of the dried catalyst precursor is contacted in a hydrogen atmosphere with both the hydrocarbon and sulfur, or sulfur-bearing compound, and heated at conditions which decompose said catalyst precursor. For example, a fixed bed of the dried catalyst precursor is charged into a reaction vessel and contacted with a liquid hydrocarbon, or admixture of liquid hydrocarbons, generally at a flow rate of hydrocarbon:catalyst precursor of from about 0.05 to about 50, preferably from about 0.1 to about 10, volumes of hydrocarbon per volume of catalyst per hour, a flow rate of hydrogen ranging from about 250 to about 5000 SCF/Bbl, preferably from about 500 to about 3000 SCF/Bbl, and at pressures ranging from about 50 to about 4000 pounds per square inch gauge (psig), preferably 150 to about 2500 psig. Typically the hydrocarbon is introduced downflow, but can be introduced upflow or downflow, over the bed of catalyst precursor, with the organo, or hydrocarbyl sulfur compound being added to the hydrocarbon feed. The organo, or hydrocarbyl sulfur compound is added in sufficient quantity to the feed such that the sulfur content of the feed ranges from about 0.1 percent to about 90 percent, preferably from about 0.5 percent to about 3 percent, calculated as elemental sulfur based on the weight of the hydrocarbon feed. The temperature of the reaction is gradually raised until the decomposition temperature of the catalyst precursor is reached, at which time the temperature is held substantially constant until the decomposition reaction is completed. Typically the decomposition temperature of the catalyst precursor ranges between about 200° C. and 400° C., more often between about 250° C. and 350° C.

The catalyst of this invention can be promoted with an additional hydrogenation-dehydrogenation metal, or metals, to further dramatically increase the activity of the finished catalyst. Suitably, this is done by the further addition of a Group VIII metal of the Periodic Table of the Elements (E. H. Sargent & Co., Copyright 1962, Dyna-Slide Co.), which metal can be added to the refractory porous inorganic oxide, or alumina, support prior to, simultaneously with, or subsequent to the decomposition of the catalyst precursor on treatment of the catalyst precursor in the presence of hydrogen, hydrocarbon, and sulfur components. Typically such metal promoter, or metal promoters, notably, iron, cobalt, and nickel, alone or in admixture one metal with another, or with other metals, is incorporated with the support, notably alumina, as via cogellation or impregnation prior to incorporation of the catalyst precursor with the dried, calcined support. Preferred promotors are cobalt, nickel, and ruthenium, most preferably cobalt and nickel, because of the extraordinary expense of ruthenium.

Group VIII metal components, admixed one component with another or with a third or greater number of metal components, are preferably composited or intimately associated with the porous inorganic oxide support, e.g, alumina, by impregnation of the support with metals via an "incipient wetness" technique, or technique wherein a metal, or metals is contained in solution, preferably in water or methyl alcohol, in measured amount, and the entire solution is absorbed into the support and subsequently dried to form the catalyst. The volume amount of solution to be employed in such recipe is separately determined by measuring the amount of solvent required to wet a known weight of support to the point where some liquid bridging between particles or some miniscus formation between particles and container walls just becomes evident. This ratio of volume of solution to weight of support is then used proportionally to calculate the volume of solution containing catalytic metals to be used in the incipient wetness impregnation. Impregnation by adsorption of the metals from dilute solution onto the support can also be used but this method is more appropriate for low concentrations, e.g., from about 0.01 to about 1.0 percent of catalytic metals desired, and it is less preferable for use in the higher metals concentration ranges. The metal impregnated support, after impregnation, is dried, e.g., at temperatures ranging from about 20° C. to about 150° C., preferably at ambient temperatures, e.g., from about 20° to about 30° C., until free flowing and then from about 80° C. to about 110° C. as in a circulating air, vacum oven, microwave oven, or the like. A catalyst formed from the improved $B_x[Mo_3S_z]$ precursor catalyst supported on alumina, and impregnated with additional cobalt has been found to have a superior HDN and HDS activity compared to conventionally prepared (calcined) commercial catalysts.

The molybdenum polysulfide precursor catalysts can be conveniently prepared from a water or an off-the-shelf aqueous dilute or concentrated ammonium hydroxide solution of ammonium heptamolybdate, ammonium molybdate, ammonium dimolybdate, or ammonium thiomolybdate, i.e., molybdenum (VI) compounds, one or the other or mixtures of which can be reacted with a freshly made ammonium hydropolysulfide or diammonium polysulfide solution, or both, to form the catalyst precursor, $B_x[Mo_3S_z]$. To form the ammonium hydropolysulfide or diammonium polysulfide solution, or admixture thereof, $NH_4S_xH/(NH_4)_2S_x$, 1200 ml of aqueous concentrated ammonium hydroxide (concentration about 15 moles per liter), and 1800 ml of distilled water are admixed together, and hydrogen sulfide is bubbled or sparged therethrough at ambient temperature to thoroughly saturate the solution. The reaction produces heat and therefore the sparging must periodically be stopped to allow the solution to cool before more hydrogen sulfide is added. The formation of the ammonium sulfide/ammonium hydrosulfide is completed when at ambient temperature the solution does not accept further hydrogen sulfide. A 540 gram aliquot of elemental sulfur powder is then added at ambient temperature, with vigorous stirring to dissolve the sulfur in the solution, this reaction being generally represented by the equation:

$$NH_4^+ + H_2S + S_8° \rightleftharpoons NH_4S_xH/(NH_4)_2S_x$$

Reaction between the $NH_4S_xH/(NH_4)_2S_x$ and, e.g., the ammonium heptamolybdate, $(NH_4)_6Mo_7O_{24}$, at preselected conditions produces the molybdenum polysulfide catalyst precursor species falling within the following spectrum of potential products, to wit: (a) $(NH_4)_nMo_mS_x$ a brown amorphous $Mo_3$ structure of variable sulfur content; (b) $(NH_4)_2[Mo_3(S_2)_6S]$, a maroon crystalline $Mo_3$ structure of variable sulfur content; and (c) $(NH_4)_2[Mo_3(S_2)_6S]$, a red crystalline $Mo_3$ structure also or variable sulfur content. Whereas the precursors which formed the most active catalyst species were found to be the red crystalline $Mo_3$ materials, $B_x[Mo_3S_z]$ catalyst precursors where z is less than or equal to 15 can now be formed, consistently and reproducibly from virtually any of these starting materials; and finished catalysts can be produced, consistently and reproducibly, from these catalyst precursors which have high aromatics hydrogenation and hydrodenitrogenation activity.

In the preparation of the catalyst precursors, the catalyst precursors are decomposed in an atmosphere of hydrogen, in the presence of hydrocarbon and sulfur; the latter species of which can be provided by a sulfur-containing hydrocarbon species, or separately by a hydrocarbon compound, or compounds, and sulfur or a sulfur-containing compound, or compounds. The catalyst precursors decompose at hydrotreating conditions, and at temperatures ranging between about 200° C. and 400° C., and more generally between about 250° C. and 350° C. which temperatures correspond generally with, or are exceeded by hydrotreating temperatures. Where, however, the decomposition temperature of the catalyst precursor is lower than the desired hydrotreating temperature, the temperature in conducting the hydrotreating process is raised to that which is desired for conducting the hydrotreating operation. In a typical operation, hydrotreating conditions are provided as regards hydrogen pressure, space velocity, and hydrogen gas recycle rate, and the temperature is gradually raised to the decomposition temperature of the catalyst precursor, the catalyst precursor is decomposed in the presence of the hydrogen, hydrocarbon and sulfur to form the catalytically active species, and the temperature then further increased as desired to conduct the hydrotreating operation. Hydrotreating conditions vary considerably depending on the nature of the hydrocarbon being hydrogenated, the nature of the impurities or contaminants to be reacted or removed, and, inter alia, the extent of conversion desired, if any. In general however, the following are typical conditions for hydrotreating a naphtha boiling within a range of from about 25° C. to about 210° C., a diesel fuel boiling within a range of from about 170° C. to 350° C., a heavy gas oil boiling within range of from about 325° C. to about 475° C., or residual containing from about 10 percent to about 50 percent of a meterial boiling above about 575° C., to wit:

| Feed | Temperature °C. | Pressure, psig | Space Velocity V/V/Hr | Hydrogen Gas Rate SCF/B |
|---|---|---|---|---|
| Naphtha | | | | |
| Typical | 100–370 | 150–800 | 0.5–10 | 100–2000 |
| Preferred | 150–260 | 250–400 | 2–6 | 500–1500 |
| Diesel Fuel | | | | |
| Typical | 200–400 | 250–1500 | 0.5–4 | 500–6000 |
| Preferred | 260–340 | 400–1000 | 1–2 | 1000–2000 |
| Heavy Gas Oil | | | | |
| Typical | 260–430 | 250–2500 | 0.3–2 | 1000–6000 |
| Preferred | 320–385 | 600–1250 | 0.5–1 | 1500–4000 |
| Residuum | | | | |
| Typical | 340–450 | 1000–5000 | 0.1–1 | 2000–10,000 |
| Preferred | 360–400 | 1250–2000 | 0.25–0.5 | 4000–6000 |

The invention will be more fully understood by reference to the following selected nonlimiting examples and comparative data which illustrate its more salient features. Reactant quantities are given in terms of metric units (cubic centimeters, cc, or grams), flow rates in terms of liters per hour, pressures in pounds per square inch gauge (psig), and temperatures in degrees Centigrade, except as otherwise specified.

EXAMPLES

The following describes the preparation of specific catalyst precursor materials, the preparation of highly active, highly selective hydrotreating catalysts from the precursor materials, the use of said catalysts in conducting a series of hydrocarbon hydrotreating runs, and comparative runs made with catalysts not of this invention.

Catalysts were prepared, and data were obtained in a 300 cc autoclave unit provided with an automatic stirrer, the unit having been equipped with slurried catalyst and reactant inlets, a hydrogen gas inlet, and sample and purge gas outlets. The autoclave unit was operated while maintaining a stirred, approximately 150 cc liquid phase, while injecting hydrogen into an approximately 150 cc vapor space at a rate of 2 liters per hour, while simultaneously continuously removing an $H_2S$-containing hydrogen stream to maintain a <5% $H_2S$/hydrogen atmosphere within the autoclave. In preparing the catalyst for conducting a run, a weighed charge of 100–150 mesh (Tyler) average particle size of the sulfided catalyst precursor was slurred in hexadecane from a secondary overhead vessel and this was added to the autoclave, the slurry having been pressured into the autoclave with 600 psig hydrogen. The feed charged into the unit was a slurry constituted of 40 cc methylnaphthalene (MNAP), 10 grams of dibenzolthiophene (DBT) and 2 grams of 2,6-dimethylquinoline (DMQ) in 100 cc of hexadecane heated to 325° C. The stirrer was turned at 450 rpm, and pressure increased until it lined out at 500 psig. The sulfided catalyst precursor decomposed at on-oil conditions forming the hydrotreating catalyst in situ. The ability of the catalyst to produce hydrogenation of the MNAP, hydrodesulfurization of the DBT, and hydrodenitrogenation of the DMQ over a period of six hours was taken as a measure of the effectiveness of the catalyst for use in conducting these types of hydrotreating reactions. Product from the autoclave was withdrawn and then passed to a capillary gas chromatograph and analyzed. First order rate constants for the disappearance of the MNAP and DBT, and zero order rate constants with induction for disappearance of the DMQ were calculated.

High sulfur $B_x[Mo_3S_z]$ catalyst precursors, i.e., precursors wherein $Z>15$, were prepared and these specimens treated at elevated temperature in an ammonium sulfide or dilute ammonium polysulfide solution containing varying levels of sulfur, this treatment stripping the sulfur from the catalyst precursor as well as reducing carbon retention in the final catalyst. Different methods were utilized to make the ammonium sulfide or dilute ammonium polysulfide solutions.

Method A

In this method, an ammonium polysulfide solution was made containing high levels of sulfur. 540 gm of sulfur were added to 1200 cc of $NH_4OH$ (18 mole $NH_4OH$) along with 1800 cc of distilled $H_2O$. $H_2S$ was bubbled through the solution for 2 hours at the rate of 1800 cc/min. The resulting solution contained 9 moles of $(NH_4)_2S_n$ where $n=2.87$.

Method B

In this method, an ammonium polysulfide solution containing low levels of sulfur was made. 36 gm of sulfur were added to 1200 cc of concentrated $NH_4OH$ along with 1800 cc of deionized $H_2O$. The solution was sparged with $H_2S$ at the rate of 1800 cc/min for 2 hours. The solution contained $(NH_4)_2S_n$ with $n=1.13$.

Method C

A solution of concentrated $(NH_4)_2S$ was made for secondary treatment of the high sulfur Mo trimer to reduce the sulfur level to $Z=13-15$ or below. In this case, 3000 cc of concentrated $NH_4OH$ was sparged with $H_2S$ until no further $H_2S$ would dissolve when the solution was at ambient room temperature.

The following examples demonstrate the invention, and the advantages obtained thereby. Examples 1 and 2 demonstrate the state-of-the art prior to the time of the present invention, and Examples 3–5 demonstrate the present invention relating to the preparation of the improved, high activity Mo trimer with low sulfur and low carbon contents.

In Example 1 immediately following, it is demonstrated that a catalyst prepared from a tri-molybdenum polysulfide catalyst precursor by on-oil decomposition is superior to one prepared by decomposition of an identical catalyst precursor material in an inert gas atmosphere. This example, given in parent application Ser. No. 399,947, supra (Example 1), is illustrative of a final catalyst composition having a Z value of 15–20 and high carbon content; this relatively high activity catalyst providing only moderate activity as contrasted with catalysts made pursuant to the practice of the present invention.

EXAMPLE 1

A sample of the ammonium form of the material, $(NH_4)_2[Mo_3(S_2)_6S]$, designated Catalyst A precursor, was prepared by dissolving 160.0 gm of ammonium heptamolybdate $(NH_4)_6Mo_7O_{24}\cdot 4H_2O$, containing 0.906 mole of Mo in 800 cc of $H_2O$ with warming to about 70°–80° C. This warm solution was then added to a freshly prepared and heated solution of aqueous ammonium polysulfide in a 6-liter Ehrlenmeyer flask heated in a water bath and stirred with a Teflon coated magnetically driven stirring bar. The solution was stirred and heated at 60°–65° C. in the watch glass covered flask for 5 hours, after which the flask of material was cooled in flowing water to room temperature and immediately filtered and washed with 100 gm aliquots of ammonium polysulfide solution, ammonium sulfide solution, water, ethanol, carbon disulfide, and diethyl ether (in that order), after which the micro-crystalline material was dried in a desiccator. The yield was approximately 289 gms of the catalyst precursor material.

Catalyst A precursor, in amount weighing 5 grams and containing 1.94 gm of Mo was slurried in 50 ml of hexadecane and charged to a small vessel for the in situ preparation of Catalyst A. A 300 cc autoclave was charged with 100 ml of hexadecane, 40 ml of 1-methylnaphthalene, 10 gm of dibenzothiophene and 2 gm of dimethylquinoline. The autoclave was closed and stirring started at 450 RPM. Hydrogen was added to the reactor at 2 liters/hr to maintain the $H_2S$ concentration in the reactor at <5 mol %. The reactor temperature was increased to 325° C. and the pressure maintained at 500 psig. When the autoclave was at steady state, the 5-gm sample of the Catalyst A precursor slurried in hexadecane was pressured into the autoclave. Samples were withdrawn every hour over a 6-hour period and analyzed by capillary GC. Rate constants were calculated using first order kinetics for 1-methylnaphthalene (MNAP hydrogenation) and dibenzothiophene (HDS) disappearance. Zero order kinetics with an induction time were used to calculate rate constants for the disappearance of nitrogen-containing compounds (HDN). The rate constants were adjusted to a "per gram of molybdenum" basis. These data are given in Table I.

For purposes of comparison, a similar test was carried out on a portion of the Catalyst A precursor except the material was decomposed in flowing nitrogen as described in U.S. Pat. No. 4,243,554. A sample of the Catalyst A precursor was thus charged to a tube furnace and heated from room temperature to 450° C. at a rate of 20° C./min and held for one hour at 450° C. The sample was allowed to cool to room temperature and discharged in a glove box. A 5-gram sample containing 3.00 gm of Mo was slurried in 50 cc of hexadecane and the autoclave test carried out as described above. The rate constants on a "per gram of molybdenum" basis are compared in Table I. Quite obviously, the catalyst species prepared from the molybdenum trimer profoundly differs from those produced by the teaching of the patent.

TABLE I

| Catalyst A | Rate Constants/gm of Mo $(Hr)^{-1}$ | | |
|---|---|---|---|
| | MNAP Hydrogenation | HDN | HDS |
| Decomposed "On-Oil" | 0.36 | 0.86 | 0.07 |
| Decomposed in $N_2$ | 0.21 | 0.42 | 0.06 |

These results show that decomposing the catalyst precursor under reaction, or on-oil conditions resulted in a catalyst with 71% more 1-methylnaphthalene hydrogenation activity and 104% more activity for the hydrodenitrogenation of dimethylquinoline. It will be observed that Catalyst A has higher activity for hydrodenitrogenation in comparison to its activity for hydrodesulfurization.

Example 2 is illustrative of the wide range of difference in activities observed between two catalysts prepared by the method described in parent application Ser. No. 399,947, supra.

EXAMPLE 2

A Mo trimer precursor was prepared by dissolving 160 gm of ammonium heptamolybdate in 80 cc of deionized water with heat. This solution was added to 3200 cc of ammonium polysulfide solution (Method B) and heated for 17 hours at 62° C. and later for 6 hours at 78° C. The material was washed and purified in a manner similar to that employed in Example 1. This catalyst was labelled Catalyst B.

Catalyst A precursor, as employed in Example 1, and Catalyst B precursor, in amounts weighing 5 grams, were each slurried in 50 ml of hexadecane and charged to a small vessel for the in situ preparation. A 300 cc autoclave was charged with 100 ml of hexadecane, 40 ml of 1-methylnaphthalene, 10 gm of dibenzothiophene and 2 gm of dimethylquinoline. The autoclave was closed and stirring started at 450 RPM. Hydrogen was added to the reactor at 2 liters/hr to maintain the $H_2S$ concentration in the reactor at <5 mol %. The reactor temperature was increased to 325° C. and the pressure maintained at 500 psig. When the autoclave was at steady state, the 5-gm sample of the catalyst precursor slurried in hexadecane was pressured into the autoclave. Samples were withdrawn every hour over a 6-hour period and analyzed by capillary GC. Rate constants were calculated using first order kinetics for 1-methylnaphthalene (MNAP hydrogenation) and dibenzothiophene (HDS) disappearance. Zero order kinetics with an induction time were used to calculate rate constants for the disappearance of nitrogen-containing compounds (HDN). The analysis and reaction rate data are compared in Table II

TABLE II

| Catalyst | A | B |
|---|---|---|
| C, Wt. % | 0.48 | 0.02 |
| H, Wt. % | 1.39 | 1.00 |
| S, Wt. % | 59.50 | 43.00 |
| Mo, Wt. % | 29.70 | 39.30 |
| S/Mo | 5.99 | 3.27 |
| C/Mo | .128 | .008 |
| Z | 18.0 | 9.8 |
| Relative Catalytic Activity | | |
| Arom. Hydro. | 100 | 241 |
| HDN | 100 | 241 |
| HDS | 100 | 177 |

The results show that Catalyst B is decidedly superior to Catalyst A with regard to aromatics hydrogenation and HDN.

Although the hydrodesulfurization, HDS, activity is also superior for Catalyst B, it will be noted that the level of activity is so low that small differences in activity result in a large change in relative activities. For this reason, further comparisons do not include HDS activities, except where the precursor is promoted with Co or Ni. In such instances, the HDS activities do become significant.

Notable differences between Catalysts A and B are shown in the sulfur and carbon contents. The sulfur and carbon contents of these materials were believed in some way responsible for the difference in activities between these catalysts. A new technique was required for the consistent, and reproducible production of the higher activity catalysts, but the reproduction of such catalysts was until now largely a hit-and-miss proposition.

The following examples are exemplary of the new approach in developing a reproducible synthesis of higher activity catalysts such as Catalyst B.

EXAMPLE 3

The approach taken to synthesizing a Mo trimer with Z=13–15 or lower along with low carbon content was to first synthesize and then accept a precursor with Z>15 with high carbon content, but then reduce the sulfur and carbon levels. This was accomplished by treating the high sulfur-high carbon catalyst precursor at elevated temperature with a concentrated solution of $(NH_4)_2S$. Two materials were synthesized: (1) Catalyst A′ similar to the material of Example A and (2) Catalyst C having a very high level of sulfur. Catalyst C was made by reacting 353 gm of ammonium heptamolybdate with 1200 ml of concentrated $NH_4OH$ forming $(NH_4)_2MoO_4 \cdot xH_2O$. This material was then reacted with an ammonium polysulfide solution (3000 ml) made using Method A. The reaction was carried out for 70 hours at 90° C. Properties of the two materials are summarized in Table III below:

TABLE III

| Catalyst | A′ | C |
|---|---|---|
| C, Wt. % | 0.48 | — |
| H, Wt. % | 1.97 | 3.42 |
| S, Wt. % | 57.50 | 66.99 |
| Mo, Wt. % | 32.80 | 5.02 |
| S/Mo | 5.25 | 40.2 |
| C/Mo | 0.12 | — |
| Z | 15.7 | 121 |
| Relative Catalyst Activity[1] | | |
| Arom. Hydro. | —[2] | 11 |
| HDN | —[2] | 18 |

[1]Relative to Catalyst A.
[2]Not measured, but believed similar to Catalyst A.

Analysis of Catalyst A′ show this catalyst to be quite similar to Catalyst A. Catalyst C, on the other hand, shows a very high sulfur level (Z=121) and the hydrogen content indicates the carbon content should be quite high. The catalytic performance of Catalyst C was quite poor.

EXAMPLE 4

Both Catalyst A′ and C were specially treated to lower the sulfur and carbon contents. Catalyst D was formed from Catalyst C by treating a 370 gm portion of Catalyst C with 3700 cc of concentrated ammonium sulfide (Method C) for 17 hours at 60°–70° C. Catalyst E was formed from Catalyst A′ by treating a 100 gm portion of Catalyst A′ with 1000 cc of concentrated ammonium sulfide (Method C) for 5 hours at 70° C. The properties of Catalysts D and E are summarized in Table IV-A below:

TABLE IV-A

| Catalyst | D | E |
|---|---|---|
| C, Wt. % | 0.22 | 0 |
| H, Wt. % | 1.18 | 0.87 |
| S, Wt. % | 54.03 | 58.38 |
| Mo, Wt. % | 37.98 | 34.89 |
| S/Mo | 4.26 | 5.0 |
| C/Mo | 0.046 | 0 |
| Z | 12.8 | 15.0 |
| Relative Catalyst Activity[1] | | |
| Arom. Hydro. | 231 | 162 |
| HDN | 250 | 155 |

[1]Activity of Catalyst A = 100.

The profound improvement in aromatics hydrogenation and hydrodenitrogenation activities of these catalysts, as contrasted with Catalysts A' and C are apparent. By utilizing this special treatment, the sulfur and carbon contents were lowered, i.e., to Z=13-15 and C/Mo<0.05. As a result, catalyst activity was thus profoundly improved for both catalysts.

Two other catalysts, Catalysts F and G, were prepared in similar manner, the catalytic results obtained showing good reproducibility in making the improved catalysts. The activities obtained with these catalysts are reproduced below in Table IV-B.

TABLE IV-B

| Catalyst, Rel. Act.[1] | F | G |
|---|---|---|
| Arom. Hydro. | 201 | 186 |
| HDN | 127 | 183 |

[1] Activity of Catalyst A = 100.

EXAMPLE 5

Supported catalysts were prepared using Catalyst D as a precursor. Thus, 66.67 gms of Catalyst D were dissolved in DMSO solvent and impregnated onto 200 gm of 14–35 mesh $Al_2O_3$. The resulting catalyst contained 10.4% Mo and was labeled Catalyst H.

A 100 gm portion of this catalyst was impregnated with 15.7 gm of cobalt acetate dissolved in 90 cc of deionized water. This catalyst, Catalyst I, contained 3.7% Co.

Both Catalysts H and I were dried at 100° C. but not calcined. These catalysts along with a commercial Catalyst J were tested in a fixed bed reactor after sulfiding with 10% $H_2S$ in $H_2$ at 330° C. for 17 hours. The feed used in the testing was a light cat cycle oil containing 1.75% S and 272 ppm N. Conditions for the test were 750 psig, 1500 SCF/B $H_2$, 0.2–1.75 LHSV, and 325° C. The results are summarized in Table V below:

TABLE V

| Catalyst | H | I | J |
|---|---|---|---|
| Catalyst | | | |
| Wt. % Mo | 10.4 | 10.0 | 14.1 |
| Wt. % Promoter | — | 3.7 (Co) | 3.7 (Ni) |
| Catalyst Activity | | | |
| HDN | 58 | 111 | 100 |
| HDS | 23 | 118 | 100 |
| HDN/HDS | 3.1 | 1.2 | 1.3 |

The results show that the HDN and HDS activity of the unpromoted Catalyst H was somewhat lower than that of the commercial Catalyst J, but possessed a much higher HDN/HDS selectivity. Catalyst I showed better HDN and HDS activity than Catalyst J even though it contains less of the catalytic metals. It is nonetheless surprising that Catalyst I has better HDN activity than Catalyst J when considering that the promoter is Co instead of Ni, since Ni is a better promoter for HDN than Co.

It is apparent that various modifications and changes can be made without departing the spirit and scope of the invention.

Having described the invention, what is claimed is:

1. In a process for the preparation of a hydrotreating catalyst from a catalyst precursor salt characterized by the formula $$B_x[Mo_3S_z]$$

where
B is an ammonium ion, polyammonium ion, or quaternary phosphonium ion, or a hydrocarbyl substituted ammonium ion, hydrocarbyl substituted polyammonium ion, or hydrocarbyl substituted tertiary or quaternary phosphonium ion,
x is 1 where B is a divalent cationic moiety, or 2 where B is a monovalent cationic moiety, $[Mo_3S_z]$ is a divalent anionic moiety wherein
z is an integer greater than 15,
by contacting together and decomposing said hydrogen precursor salt in the presence of hydrogen, hydrocarbon and sulfur to form said hydrotreating catalyst, the improvement comprising
dispersing said hydrotreating catalyst precursor salt, prior to decomposition in the presence of hydrogen, hydrocarbon and sulfur, in an ammonium sulfide or dilute ammonium polysulfide solution and heating sufficient to remove sulfur from said catalyst precursor salt and lower the value of z of the formula $B_x[Mo_3S_z]$ to 15 or less.

2. The process of claim 1 wherein the value of z of the formula $B_x[Mo_3S_z]$ catalyst precursor after treatment with the ammonium sulfide or ammonium polysulfide solution ranges from about 10 to about 15.

3. The process of claim 2 wherein the value of z of the catalyst precursor after treatment with the ammonium sulfide or ammonium polysulfide solution ranges from about 10 to about 13.

4. The process of any one of claims 1, 2, or 3 wherein the catalyst precursor salt is distended upon a porous inorganic oxide support.

5. The process of any one of claims 1, 2, or 3 wherein the catalyst precursor salt is distended upon a porous inorganic oxide support, and the support contains from about 3 percent to about 20 percent of Mo as the precursor salt, $B_x[Mo_3S_z]$, calculated as Mo on an ignition loss free basis.

6. The process of any one of claims 1, 2, or 3 wherein the catalyst precursor salt is distended upon a porous inorganic oxide support, and the support contains from about 6 percent to about 17 percent of Mo as said catalyst precursor salt, $B_x[Mo_3S_z]$, calculated as Mo or an ignition loss free basis.

7. The process according to any one of claims 1, 2, or 3, wherein the catalyst precursor salt is distended on an alumina support.

8. The process according to any one of claims 1, 2, or 3, wherein the catalyst precursor salt is distended on the support, and the composite contains a promoter metal, or metals, selected from Group VIII of the Periodic Table of the Elements.

9. The process according to any one of claims 1, 2, or 3, wherein the catalyst precursor is distended on the support, and the composite contains a metal selected from molybdenum, tungsten, iron, cobalt, and nickel, alone or in admixture one metal with another, or with other metals.

10. The process according to and one of claims 1, 2, or 3, wherein the catalyst precursor is distended on the support, and the composite contains an admixture of cobalt and molybdenum, or nickel and molybdenum.

11. The process of any one of claims 1, 2, or 3, wherein B of the $B_x[Mo_3S_z]$ catalyst precursor salt from which the finished catalyst is prepared is a non-carbon containing moiety and the atomic ratio of C/Mo of the finished catalyst precursor is less than about 0.05.

* * * * *